(12) United States Patent
Kawano et al.

(10) Patent No.: US 7,987,359 B2
(45) Date of Patent: Jul. 26, 2011

(54) INFORMATION COMMUNICATION SYSTEM, INFORMATION COMMUNICATION APPARATUS AND METHOD, AND COMPUTER PROGRAM

(75) Inventors: Shinichi Kawano, Tokyo (JP); Takao Morita, Tokyo (JP); Yukihiko Aoki, Tokyo (JP); Hideho Gomi, Kanagawa (JP); Tatsuaki Yukawa, Kanagawa (JP); Yuichi Izumi, Tokyo (JP)

(73) Assignee: Sony Corporation, Tokyo (JP)

( * ) Notice: Subject to any disclaimer, the term of this patent is extended or adjusted under 35 U.S.C. 154(b) by 992 days.

(21) Appl. No.: 11/456,004

(22) Filed: Jul. 6, 2006

(65) Prior Publication Data
US 2007/0022195 A1    Jan. 25, 2007

(30) Foreign Application Priority Data

Jul. 22, 2005   (JP) .................................. 2005-212631

(51) Int. Cl.
| | |
|---|---|
| H04L 29/06 | (2006.01) |
| H04L 9/32 | (2006.01) |
| H04L 9/08 | (2006.01) |
| G06F 11/00 | (2006.01) |
| G06F 12/14 | (2006.01) |
| G06F 15/173 | (2006.01) |
| G06F 21/00 | (2006.01) |

(52) U.S. Cl. ............ 713/161; 713/171; 726/22; 726/23; 709/225; 705/51; 380/278

(58) Field of Classification Search .................. 713/189, 713/161; 726/22
See application file for complete search history.

(56) References Cited

U.S. PATENT DOCUMENTS

| | | | | |
|---|---|---|---|---|
| 5,999,536 A | * | 12/1999 | Kawafuji et al. | 370/401 |
| 6,067,569 A | * | 5/2000 | Khaki et al. | 709/224 |
| 6,381,649 B1 | * | 4/2002 | Carlson | 709/235 |
| 6,452,915 B1 | | 9/2002 | Jorgensen | |
| 6,839,759 B2 | * | 1/2005 | Larson et al. | 709/228 |
| 7,194,354 B1 | * | 3/2007 | Oran et al. | 701/207 |
| 7,421,737 B1 | * | 9/2008 | Hernacki et al. | 726/22 |
| 7,720,055 B2 | * | 5/2010 | Kadambi et al. | 370/389 |
| 2002/0188839 A1 | * | 12/2002 | Noehring et al. | 713/153 |

(Continued)

FOREIGN PATENT DOCUMENTS

JP   2003-188903   7/2003

(Continued)

OTHER PUBLICATIONS

Digital Transmission Content Protection Specification, vol. 1, Revision 1.4 (Informational Version), Feb. 28, 2005, pp. 1-81.

(Continued)

*Primary Examiner* — Taghi T Arani
*Assistant Examiner* — Morshed Mehedi
(74) *Attorney, Agent, or Firm* — Oblon, Spivak, McClelland, Maier & Neustadt, L.L.P.

(57) ABSTRACT

In an information communication system, information communication devices exchange an IP packet over IP networks. When performing a predetermined packet exchanging procedure in which the number of router hops is limited to a predetermined control value or less, each of the information communication devices monitors Time-To-Live values designated in the headers of IP packets received over a period of time from the start of the predetermined packet exchanging procedure to immediately before the end of the predetermined packet exchanging procedure to continuously update the maximum Time-To-Live value of the monitored Time-To-Live values, and checks whether the maximum Time-To-Live value does not exceed the control value.

14 Claims, 9 Drawing Sheets

U.S. PATENT DOCUMENTS

| | | | |
|---|---|---|---|
| 2002/0194251 A1* | 12/2002 | Richter et al. | 709/105 |
| 2003/0172163 A1* | 9/2003 | Fujita et al. | 709/226 |
| 2004/0168062 A1* | 8/2004 | Isozaki et al. | 713/171 |
| 2005/0025158 A1* | 2/2005 | Ishikawa et al. | 370/395.21 |
| 2006/0168318 A1* | 7/2006 | Twiss | 709/238 |
| 2007/0009232 A1* | 1/2007 | Muraki et al. | 386/95 |

FOREIGN PATENT DOCUMENTS

| | | |
|---|---|---|
| JP | 2003-521138 | 7/2003 |
| JP | 2004-180020 | 6/2004 |
| JP | 2004-282414 | 10/2004 |

OTHER PUBLICATIONS

RFC791 Internet Protocol, DARPA Internet Program Protocol Specification, Sep. 1981, pp. 1-52.

DTCP vol. 1, Supplement E Mapping DTCP to IP, Revisions 1.1 (Informational Version), Feb. 28, 2005, pp. 1-32.

Fred Baker, "Requirements for IP Version 4 Routers", RFC 1812, Jun. 1995, pp. 1-176.

"Creation of digital AV network based on Copy once, DRM Opens the Path to the Digital AV Network, Part 2 Spread of security based on networks", Nikkei Electronics, No. 873, May 10, 2004, pp. 88-95.

* cited by examiner

FIG. 4

|  | msb | | | | | | | lsb |
|---|---|---|---|---|---|---|---|---|
| Type[0] | 0 | 0 | 0 | 0 | 0 | 0 | 0 | 1 |
| Length[0] | (msb) Byte Length of Control and AKE_Info Fields(N+8) ||||||||
| Length[1] | ||||||||(lsb) |
| Control[0] | reserved (zero) |||| ctype/response ||||
| Control[1] | Category = $0000_2$ (AKE) |||| AKE_ID = 00002 ||||
| Control[2] | subfunction ||||||||
| Control[3] | AKE_procedure ||||||||
| Control[4] | exchange_key ||||||||
| Control[5] | subfunction_dependent ||||||||
| Control[6] | AKE_label ||||||||
| Control[7] | number(option) |||| status ||||
| AKE_Info[0..N-1] | AKE_Info ||||||||

INFORMATION COMMUNICATION SYSTEM, INFORMATION COMMUNICATION APPARATUS AND METHOD, AND COMPUTER PROGRAM

CROSS REFERENCES TO RELATED APPLICATIONS

The present invention contains subject matter related to Japanese Patent Application JP 2005-212631 filed in the Japanese Patent Office on Jul. 22, 2005, the entire contents of which are incorporated herein by reference.

BACKGROUND OF THE INVENTION

1. Field of the Invention

The present invention relates to information communication systems, information communication apparatuses and methods, and computer programs therefor for transmitting information content to be protected by copyright over Internet protocol (IP) networks. In particular, the present invention relates to information communication systems, information communication apparatuses and methods, and computer programs therefor for transmitting IP packets over IP networks with a limited number of router hops.

More specifically, the present invention relates to an information communication system, an information communication apparatus and method, and a computer program therefor for performing an authentication and key exchange (AKE) procedure in accordance with the Digital Transmission Content Protection over Internet Protocol (DTCP-IP) standard between information devices over an IP network. In particular, the present invention relates to an information communication system, an information communication apparatus and method, and a computer program therefor for transmitting and receiving AKE commands for authentication and key exchange between devices over an IP network with a limited number of router hops.

2. Description of the Related Art

Recently, content distribution and delivery services for providing content, such as video and music, over networks have increasingly being performed. Such services allow content distribution to be carried out between remote terminals over a network without the need to move media such as compact disks (CDs) and digital versatile disks (DVDs).

Content to be handled over networks is protected under copyright laws as one of copyrighted works against unauthorized use such as unauthorized copying or tampering. In the Copyright Law of Japan, the reproduction of a work by a user him/herself for the purpose of his/her personal or home use would be permitted under Article 30, whereas, the use of copies of a work for purposes other than the personal or private use would be prohibited under Article 49 (1).

Since such content is digital data and is vulnerable to unauthorized access and modification such as copying and tampering, there is a demand for protection against unauthorized use in view of not only legal but also technical solutions.

Therefore, a number of technologies for the purpose of copyright protection against unauthorized use of digital content have been developed. For example, the Digital Transmission Content Protection (DTCP) standard, which is an industry standard for protecting digital transmission content, defines a mechanism for content transmission in a copyright-protected environment (see, for example, DTCP Specification Volume 1 Revision 1.4 (Informational Version), which is available from http://www.dtcp.com).

In DTCP, a protocol for authentication between devices for content transmission and a protocol for transmission of encrypted content are specified. In summary, the specification defines that a DTCP-compliant device should not send any easy-to-use, compressed content, such as MPEG (Moving Picture Experts Group) content, to outside the device in the unencrypted form, that key exchange necessary for decryption of encrypted content should be carried out according to a predetermined authentication and key exchange (AKE) algorithm, and that the range of devices through which key exchange is performed using AKE commands should be limited.

A content provider, or a server (DTCP source), and a content consumer, or a client (DTCP sink), share a key through an authentication procedure by sending and receiving AKE commands. The key is used to encrypt a transmission line to perform content transmission. An unauthorized client could not obtain a cryptographic key unless it has successfully been authenticated with the server, and thus could not receive the content. Further, by limiting the number and range of devices that transmit and receive AKE commands, the use of the content can be limited to personal or home use, as defined by copyright law.

Initially, DTCP defines transmission of digital content over a home network using a transmission line such as IEEE 1394. Transmission of content over the home network falls within personal or home use, as defined by copyright law.

Recently, the development of a sophisticated technology, called DTCP-IP, in which IEEE-1394-based DTCP technology is incorporated into IP network technology has advanced. Since most home networks are connected via routers to external wide area networks such as the Internet, the establishment of DTCP-IP technology provides flexible and efficient use of digital content over an IP network while protecting the content. Although DTCP-IP technology is fundamentally involved in the DTCP standard, DTCP-IP technology is different from the original, IEEE-1394-based DTCP technology in that an IP network is used as a transmission line and that encrypted content is transmitted using the HTTP or RTP protocol.

IP (Internet Protocol) itself is a network layer in which an incoming data stream from an upper transport layer, such as TCP (Transmission Control Protocol), is divided by a packet size used as a predetermined unit into packets to produce IP packets by adding headers to the packets, and the IP packets are delivered to a specified IP address. IP has a routing function (see, for example, RFC (Request For Comment) 791 INTERNET PROTOCOL).

Since a variety of devices, such as personal computers (PCs), are connected to the IP network, there is a high risk of eavesdropping or tampering of data. Therefore, DTCP-IP further specifies a method for transmission of content over the network while protecting the content although it is fundamentally a DTCP-resembling technology in which DTCP technology is incorporated into IP network technology (see, for example, DTCP Specification Volume 1 Supplement E Mapping DTCP to IP, Revision 1.1 (Informational Version), which is available from http://www.dtcp.com/).

A content transmission procedure according to DTCP-IP will be described. DTCP-compliant devices are classified into two types, i.e., one referred to as "DTCP_Source" and the other as "DTCP_Sink". A DTCP_Source device serving as a server device receives a request for content, and transmits the content. A DTCP_Sink device serving as a client device requests content, receives the content, and plays back or records the content.

First, the DTCP_Source device and the DTCP_Sink device establish a single TCP/IP connection, and authenticate each other. This authentication is referred to as a "DTCP authentication" or an "AKE (Authentication and Key Exchange)". A DTCP-compliant device has a unique device ID and key embedded therein by a certification organization called DTLA (Digital Transmission Licensing Administrator). In the DTCP authentication procedure, after the DTCP_Source device and the DTCP_Sink device use such information to verify that they are authorized DTCP-compliant devices, a key for encrypting or decrypting content, which is managed by the DTCP_Source device, can be shared between the DTCP_Source device and the DTCP_Sink device.

After performing the AKE-based authentication procedure between the DTCP-compliant devices, the DTCP_Sink device requests content on the DTCP_Source device. The DTCP_Source device can notify in advance the DTCP_Sink device of the content location for accessing the content on the DTCP_Source device via a content directory service (CDS) or the like. The DTCP_Sink device may use a protocol, such as HTTP (Hyper Text Transfer Protocol) or RTP (Real Time Protocol), to request the content. When the content is requested according to the HTTP procedure, the DTCP_Source device serves as an HTTP server and the DTCP_Sink device serves as an HTTP client, between which the transmission of the content is initiated. When an RTP-based transmission is requested, the DTCP_Source device serves as an RTP sender and the DTCP_Sink device serves as an RTP receiver, between which the transmission of the content is initiated. Other transmission protocols, such as RSTP (Real Time Streaming Protocol), may also be adopted.

When content transmission is performed according to HTTP, the HTTP client creates a TCP/IP connection for HTTP, which is different from the TCP/IP connection for the DTCP authentication. The HTTP client requests content on the HTTP server according to a similar operation procedure to the standard HTTP procedure. In response to the request, the HTTP server returns the requested content as an HTTP response. The data transmitted as the HTTP response is data into which the HTTP server, i.e., the DTCP_Source device, encrypts the content using the key shared through the AKE authentication. Upon receiving the encrypted data, the client (DTCP_Sink device) decrypts the data using the key shared through the above-described authentication to play back or record the content.

Accordingly, DTCP-IP can provide a secure content transmission protocol even over an IP network, which enables the content to be protected against eavesdropping or tampering in the middle of the transmission line by performing authentication between DTCP-compliant devices to share a key between the DTCP-authenticated devices and encrypting and decrypting transmission content.

DTCP involves not only the maintenance of the security of content transmission lines by encrypting them but also the limitation of the use of the content to personal or home use, as defined by copyright law. The initial DTCP technology assumes home networks, such as IEEE-1394-based networks, in which case the use of content is substantially limited to personal or home use. In DTCP-IP, which is a DTCP-resembling technology in which DTCP technology is incorporated into IP network technology, however, since devices can be connected to a wide area IP network, such as the Internet, via routers, there is a demand for limitation on the content transmission range.

For example, in the IP network, a parameter called Time-To-Live (TTL) is defined in the header of each IP packet in order to limit the lifetime of the IP packet (for example, see RFC (Request For Comment) 791 INTERNET PROTOCOL). An IP router decrements the TTL field value in the header whenever forwarding the IP packet (for example, see RFC 1812—Requirements for IP Version 4 Routers June 1995) so that the lifetime or expiration time of the IP packet can be represented by the TTL field value (for example, see PCT Japanese Translation Patent Publication No. 2003-521138).

In DTCP-IP, for example, a TTL field value of "3" is set, and each IP packet is checked as to whether or not the TTL field value does not exceed 3. That is, the number of router hops between the user and the other party between which the transmission and reception of AKE commands, i.e., key exchange, is carried out is limited to 3 or less (see, for example, DTCP Specification Volume 1 Supplement E Mapping DTCP to IP, Revision 1.1 (Informational Version), which is available from http://www.dtcp.com/), thereby limiting the use of content to personal or home use.

However, there are some technical problems when the DTCP application implements processing, such as obtaining and checking header information, such as TTL, of IP packets. These technical problems will be described.

As well known in the art, a communication protocol has a stack of protocols, such as TCP and IP, and the application layer is defined as the highest layer.

The existing IP protocol layer implements only the function of decrementing the TTL field value by 1 each time an IP packet passes through a router. In other words, the IP protocol layer is not configured so as to, upon receiving an IP packet, extract the TTL field value from the header of the IP packet and to notify the high application layer. This prevents the DTCP application, upon receiving an AKE command, from checking whether or not the TTL field value of the IP packet is 3 or less.

Although the existing IP protocol has a function for discarding an IP packet whose TTL field value has expired due to multiple routers hops, an IP packet whose TTL field value exceeds a predetermined value is not discarded. If a transmission destination of an AKE command checks the header of the IP packet and discards the IP packet when the TTL field value exceeds 3, a transmission source of the AKE command performs a time-consuming process for re-transmitting the AKE command because of the TCP/IP typical re-transmission control function.

One method for implementing the operation of limiting the range where an AKE command reaches using the TTL field value that is decremented by the router each time a hop occurs according to the DTCP-IP specification is to modify the IP protocol layer. However, it is costly to develop uniquely all processing modules in the TCP/IP protocol layer incorporating the function of obtaining and checking TTL field values.

In most of the current mainstream operating systems (OSs), such as Linux or Windows, which is a registered trademark of Microsoft Corporation, a protocol stack for communication, such as TCP and IP, is installed in the OS. If the IP protocol is modified, the source code deeply related to the OS will be modified, which causes various demerits.

For example, in the case of OSs whose source code has not been released, such as Windows®, the modification itself is almost impossible.

In the case of so-called open-source OSs, such as Linux, since the source code is available to the public, individuals are able to add the above-described functions of the IP protocol layer. In return, the individuals are obliged to release the source code because all relevant codes are licensed under GPL (General Public License). That is, the modification of open-source products makes it time-consuming for the developers to manage the products in the future. Further, the modification of the kernel source code deeply related to the core of the OS involves an additional test process, leading to an increase in cost.

An OS further has installed therein a network filter as a function of the processing module in the TCP/IP protocol layer. In Linux, "iptable" is an example of such a network filter. By setting this standard network filter, the processing for obtaining and checking TTL field values can be implemented using the existing TCP/IP processing module.

Problems with the use of the network filter are that (1) the set network filter can induce a side effect of impeding other communication (or services) and (2) the set network filter can be easily tampered with by any other user or process since the network filter is standard.

It is also conceived by those skilled in the art that a processing module corresponding to a network filter is uniquely developed and is used to obtain and check TTL field values. However, the development imposes significant cost, and the set network filter can induce a side effect of impeding other communication (or services).

SUMMARY OF THE INVENTION

It is therefore desirable to provide an information communication system, an information communication apparatus and method, and a computer program therefor in which information content to be protected by copyright can appropriately be transmitted over an IP network.

It is also desirable to provide an information communication system, an information communication apparatus and method, and a computer program therefor in which IP packets can appropriately be transmitted over an IP network with a limited number of router hops.

It is further desirable to provide an information communication system, an information communication apparatus and method, and a computer program therefor in which DTCP-IP AKE commands for authentication and key exchange (AKE) can appropriately be transmitted and received between devices over an IP network with a limited number of router hops.

It is further desirable to provide an information communication system, an information communication apparatus and method, and a computer program therefor in which the range of devices between which authentication and key exchange are carried out can be limited to a predetermined number of router hops or less while monitoring the TTL field values included in the headers of IP packets carrying AKE commands for authentication and key exchange.

According to a first embodiment of the present invention, there is provided an information communication system including information communication devices that exchange IP packets over an IP network. When performing a predetermined packet exchanging procedure in which the number of router hops is limited to a predetermined control value or less, each of the information communication devices monitors Time-To-Live (TTL) values designated in the headers of IP packets received over a period of time from the start of the predetermined packet exchanging procedure to immediately before the end of the predetermined packet exchanging procedure to continuously update the maximum TTL value of the monitored TTL values, and checks whether the maximum TTL value does not exceed the control value immediately before the end of the predetermined packet exchanging procedure.

The term "system" as used herein refers to a logical collection of a plurality of apparatuses (or function modules achieving a specific function) regardless of whether or not the apparatuses or function modules are housed in a single housing (the same applies to the following description).

An embodiment of the present invention provides an information communication system for transmitting information content to be protected by copyright over an IP network, particularly, an information communication system in which TTL field values designated in the headers of IP packets is used to specify the number of router hops to limit the use of distributed content to personal or private use. More specifically, when AKE commands for authentication and key exchange (AKE) are sent and received between DTCP-IP-compliant information communication devices, the range of devices between which authentication and key exchange are carried out is limited to the number of router hops or less while monitoring the TTL field values included in the headers of the IP packets carrying the AKE commands.

In DTCP-IP, for example, a TTL field value of 3 is set, and each IP packet is checked as to whether or not the TTL field value has expired. Thus, the number of router hops between DTCP devices between which transmission and reception of AKE commands, i.e., key exchange, is carried out is limited to 3 or less so that the use of content can be limited to personal or home use.

The existing IP protocol layer implements only the function of decrementing the TTL field value by 1 each time a packet passes through a router is only implemented. Thus, in order to check each IP packet received as to whether or not the TTL field value is equal to or less than the control value and sequentially discard an IP packet whose TTL field value exceeds the control value, the upper layer DTCP application obtains the TTL field value each time receiving an IP packet carrying an AKE command, which needs to modify the IP protocol layer.

However, since many OSs have the TCP/IP protocol layer incorporated therein, there arises a complex problem. To begin with, in OSs whose source code has not been released, it is not possible to modify the IP protocol layer. In OSs whose source code has been released, although it is possible to modify the IP protocol layer, the source code of such OSs should be released, which is time-consuming to manage in the future.

Although it is conceived to uniquely develop the TCP/IP protocol layer, this is costly. It is also conceived to set a network filter, which is a function of the processing module in the TCP/IP protocol layer incorporated in the OS, to obtain the TTL field values. However, there are concerns of a side effect of impeding other communication and of the set network filter being possibly broken by other users or processes.

In the information communication system according to the embodiment of the present invention, each of the information communication devices monitors TTL field values designated in the headers of IP packets received during a time period from the start of the predetermined packet exchanging procedure to immediately before the end of the predetermined packet exchanging procedure to continuously update the maximum TTL field value of the monitored TTL field values, and checks whether the maximum TTL field value does not exceed the control value immediately before the end of the predetermined packet exchanging procedure.

The application layer as the highest layer, as discussed below, uses an existing library to implement the processing of extracting a TTL field value of a packet. In the information communication system according to the embodiment of the present invention, therefore, it is not necessary to perform operations, such as modifying the IP protocol layer, uniquely developing the TCP/IP protocol layer, and modifying the OS, to implement the operation of continuously monitoring the TTL field values for a predetermined period of time during which packets are exchanged.

An information communication device that performs the predetermined packet exchanging procedure may continue the predetermined packet exchanging procedure by performing subsequent packet transmission and reception processing to complete the predetermined packet exchanging procedure when the maximum value of TTL field values extracted from packets monitored over a period of time from the start of the predetermined packet exchanging procedure to immediately before the end of the predetermined packet exchanging procedure is equal to or less than the control value, or may terminate the predetermined packet exchanging procedure without performing the subsequent packet transmission and reception processing when the maximum value exceeds the control value, whereby the number of communication parties between which the packet exchanging procedure is performed can be limited to a predetermined range of TTL field values.

When the embodiment of the present invention is applied to DTCP-IP authentication, both information communication apparatuses between which the authentication is carried out continuously monitor control commands for authentication, or AKE commands, received over a period of time from the start of the DTCP-IP authentication to immediately before the end of the DTCP-IP authentication to continuously update the maximum value of the TTL field values of the received AKE commands, and check the maximum value immediately before the end of the authentication procedure to complete the authentication procedure by performing key exchange if the maximum value is equal to or less than a predetermined control value (e.g., 3), or to terminate the authentication procedure without performing key exchange if the maximum value exceeds the predetermined control value.

For example, an information communication device serving as a source device that distributes content to an information communication device serving as a sink device according to DTCP-IP monitors, from immediately after a TCP connection for transmitting and receiving AKE commands is established, i.e., immediately after returning accept( ) in response to a connect( ) request received from the sink device, IP packets transmitted and received over the TCP connection to obtain the TTL field value for each of the IP packets, and continuously updates the maximum value of the obtained TTL field values. Then, the source device checks whether or not the maximum TTL field value is equal to or less than the control value immediately before transmitting an Exchange_Key subfunction command. If the maximum TTL field value is equal to or less than the control value, the source device proceeds to transmit the Exchange_Key subfunction command. If the maximum TTL field value exceeds the control value, the source device terminates the AKE procedure without transmitting the Exchange_Key subfunction command.

An information communication device serving as a sink device that obtains content from an information communication device serving as a source device monitors, from immediately before a TCP connection for transmitting and receiving AKE commands is established, i.e., immediately before transmitting a connect( ) request to the source device, IP packets transmitted and received over the TCP connection to obtain the TTL field value for each of the IP packets, and continuously updates the maximum value of the obtained TTL field values. Then, the sink device checks whether or not the maximum TTL field value is equal to or less than the control value immediately after receiving an Exchange_Key subfunction command. If the maximum TTL field value is equal to or less than the control value, the sink device proceeds to transmit an ACCEPTED response in response to the Exchange_Key subfunction command. If the maximum TTL field value exceeds the control value, the sink device immediately terminates the AKE procedure.

As previously discussed, when the DTCP application implements the processing of extracting a TTL field value for each IP packet carrying an AKE command to check whether or not the extracted TTL field value does not exceed a control value, and sequentially discarding an IP packet whose TTL field value exceeds the control value, a difficult operation is necessary, such as uniquely developing the TCP/IP protocol layer or modifying an OS having such a protocol stack incorporated therein. In contrast, the processing of extracting the TTL field values of the individual IP packets and continuously monitoring the extracted TTL field values can readily be implemented by using an existing library having a packet capture capability of monitoring a MAC frame, called "pcap", that is, libpcap.

Therefore, the DTCP application can continuously monitor AKE commands received over a period of time from the start of DTCP-IP authentication using libpcap to immediately before the end of the DTCP-IP authentication to continuously update the maximum TTL field value. Then, the maximum TTL field value is checked immediately before the end of the authentication procedure. If the maximum value is equal to or less than a predetermine control value (e.g., 3), key exchange is performed to complete the authentication procedure. If the maximum value exceeds the control value, the authentication procedure is terminated without performing the processing in the final stage. Thus, without the modification of the IP protocol layer, the DTCP application can limit the range of communication parties between which authentication and key exchange are carried out to a predetermined range of TTL field values.

Pcap is a packet capture function for allowing a MAC frame to be monitored, and includes "WinPcap", which is a libpcap of Windows® (see, for example, http://www.winpcap.org/).

According to a second embodiment of the present invention, there is provided a computer-readable computer program for executing on a computer system a process for exchanging IP packets with another information communication apparatus over an IP network. When performing a predetermined packet exchanging procedure in which the number of router hops is limited to a predetermined control value or less, the computer program causes the computer system to execute the steps of monitoring TTL field values designated in the headers of IP packets received over a monitoring time from the start of the predetermined packet exchanging procedure to immediately before the end of the predetermined packet exchanging procedure; storing, while continuously updating, the maximum TTL field value of the monitored TTL field values during the monitoring time; checking whether the maximum TTL field value does not exceed the control value; continuing the predetermined packet exchanging procedure by performing subsequent packet transmission and reception processing to complete the predetermined packet exchanging procedure when the maximum TTL field value of TTL field values extracted from packets monitored over a period of time from the start of the predetermined packet exchanging procedure to immediately before the end of the predetermined packet exchanging procedure is equal to or less than the control value; and terminating the predetermined packet exchanging procedure without performing the subsequent packet transmission and reception processing when the maximum TTL field value of TTL field values extracted from the packets monitored over a period of time from the start of the predetermined packet exchanging procedure to immediately before the end of the predetermined packet exchanging procedure exceeds the control value.

The computer program according to the second embodiment of the present invention is a computer program written in a computer-readable format so that predetermined processing can be executed on a computer system. In other words, the computer program according to the second embodiment of the present invention is installed in the computer system, thereby exerting a cooperative effect on the computer system to act as an information communication device in the information communication system according to the first embodiment of the present invention. A system in which a plurality of such information communication apparatuses are activated to operate as a source device and a sink device to exchange IP packets can achieve similar advantages to those of the information communication system according to the first embodiment of the present invention.

According to an embodiment of the present invention, therefore, a superior information communication system, information communication apparatus and method, and computer program therefor in which IP packets can appropriately be transmitted over an IP network with a limited number of router hops can be provided.

Further, according to an embodiment of the present invention, a superior information communication system, information communication apparatus and method, and computer program therefor in which AKE commands for authentication and key exchange (AKE) in accordance with DTCP-IP can appropriately be transmitted and received between devices over an IP network with a limited number of router hops can be provided.

Further, according to an embodiment of the present invention, a superior information communication system, information communication apparatus and method, and computer program therefor in which the range of devices between which authentication and key exchange are carried out can be limited to a predetermined number of router hops or less while monitoring the TTL field values included in the headers of IP packets carrying AKE commands for authentication and key exchange can be provided.

When the embodiment of the present invention is applied to DTCP-IP authentication, both information communication apparatuses between which the authentication is carried out, instead of extracting the TTL field value from the header for each AKE command to check whether or not the extracted TTL field value exceeds a predetermined control value and sequentially discarding an AKE command whose TTL field value exceeds the control value, perform processing of continuously monitoring AKE commands received over a monitoring time from the start of the DTCP-IP authentication to immediately before the end of the DTCP-IP authentication to continuously update the maximum value of the TTL field values of the received AKE commands. Then, the maximum TTL field value is checked immediately before the end of the authentication procedure. If the maximum value exceeds the predetermine value, the authentication procedure is terminated without performing key exchange, thereby limiting the range of parties between which key exchange is carried out to a predetermined number of router hops or less.

The DTCP application may use libpcap, which implements the packet capture function, to obtain TTL field values. Thus, development without addressing the GPL licensing issues is possible. Since libpcap is licensed under the Berkeley software distribution (BSD) license, the use of a copyright sign is sufficient for distribution of binary using this library.

According to the embodiments of the present invention, therefore, the TTL field value checking function to be implemented in an authentication and key exchange (AKE) procedure in accordance with DTCP-IP can be implemented by using an external library. Thus, it is not necessary to modify the code, such as a kernel deeply related to the OS. The number of manufacturing steps is much smaller than that when the code of the OS is modified. Further, since control relating to the TTL field value checking processing can be implemented without being shared with other users or processes, there is no concern of unauthorized control by other users or the like.

Other objects, features, and advantages of the present invention will become apparent from the following embodiments of the present invention and more detailed description with reference to the accompanying drawings.

BRIEF DESCRIPTION OF THE DRAWINGS

FIG. 4 is a diagram showing a packet format of an AKE command;

DESCRIPTION OF THE PREFERRED EMBODIMENTS

An embodiment of the present invention will be described in detail with reference to the drawings.

An embodiment of the present invention relates to an information communication system for transmitting information content to be protected by copyright over an IP network, more specifically, to an information communication system in which AKE commands for authentication and key exchange (AKE) are transmitted and received between DTCP-IP-compliant information communication devices and a key shared through the authentication and key exchange is used to safely transmit encrypted content. In the authentication and key exchange between DTCP-IP-compliant information communication devices, the TTL field values included in the headers of the IP packets carrying the AKE commands are controlled so as not to exceed 3, and the range of devices between which the authentication and key exchange are carried out is limited to a predetermined number of router hops or less.

System Configuration

Figure 1:
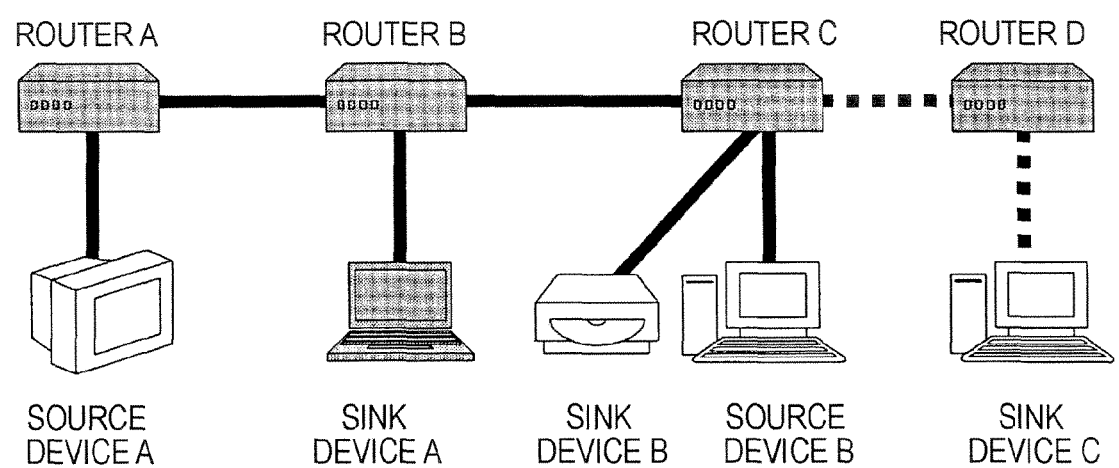
FIG. 1 is a schematic diagram showing an example structure of an information communication system according to an embodiment of the present invention.

FIG. 1 schematically illustrates an example structure of an information communication system according to an embodiment of the present invention.

DTCP-IP-based content transmission is performed between a source device serving as a server receiving a request for content and transmitting the content, and a sink device serving as a client requesting content, receiving the content, and playing back or recording the content. In the illustrated example, a source device A, which is a DTCP-IP-compliant authentication server, and a sink device A, which is a DTCP-IP-compliant authentication client, are connected over a network via routers A and B.

A source device B, which is a DTCP-IP-compliant authentication server, and a sink device B, which is a DTCP-IP-compliant authentication client, are further connected over an IP network via the routers A and B and a router C.

The existing IP protocol defines that an IP router should decrement the TTL field value embedded in the IP header by 1 whenever forwarding an IP packet and should discard an IP packet whose TTL field value has expired. That is, it is defined that each of the routers, upon routing an IP packet, should decrement the TTL field value of the IP packet by 1 and that each of the routers, upon receiving an IP packet whose TTL field value is 0, should discard the IP packet.

In the example shown in FIG. 1, when an IP packet is sent from the source device A to the sink device A, the IP packet passes through the routers A and B, and the IP packet whose TTL field value has been decremented by 2 is received by the sink device A.

For example, if an IP packet having a TTL field value of 3 is generated by the source device A and is sent to the sink device B, the IP packet reaches the router C through the routers A and B. However, the router device C discards the IP packet because the TTL field value decreases from 1 to 0. As a result, the IP packet does not reach the sink device B.

If an IP packet having a TTL field value of 3 is sent from the sink device A to the source device B, the IP packet whose TTL field value is 1 reaches the source device B. An IP packet whose TTL field value is 0 does not propagate over the network.

In the information communication system according to this embodiment, the entities of the source devices A and B, the sink devices A and B, and the routers A to C constitute a DTCP-IP AKE system. According to DTCP-IP, the range where key exchange for use in transmission of encrypted content, i.e., AKE, is carried out, is limited to the range where the TTL field value does not exceed 3, that is, the range where the number of router hops does not exceed 3. Therefore, the source devices are permitted to perform AKE with both the sink devices A and B. The source device B can perform AKE with both the sink devices A and B.

Meanwhile, a sink device C connected to the network via a router D is not permitted to perform AKE with the source devices because the number of router hops for exchanging packets exceeds 3. In other words, the sink device C is outside the DTCP-IP AKE system shown in FIG. 1.

Figure 2:
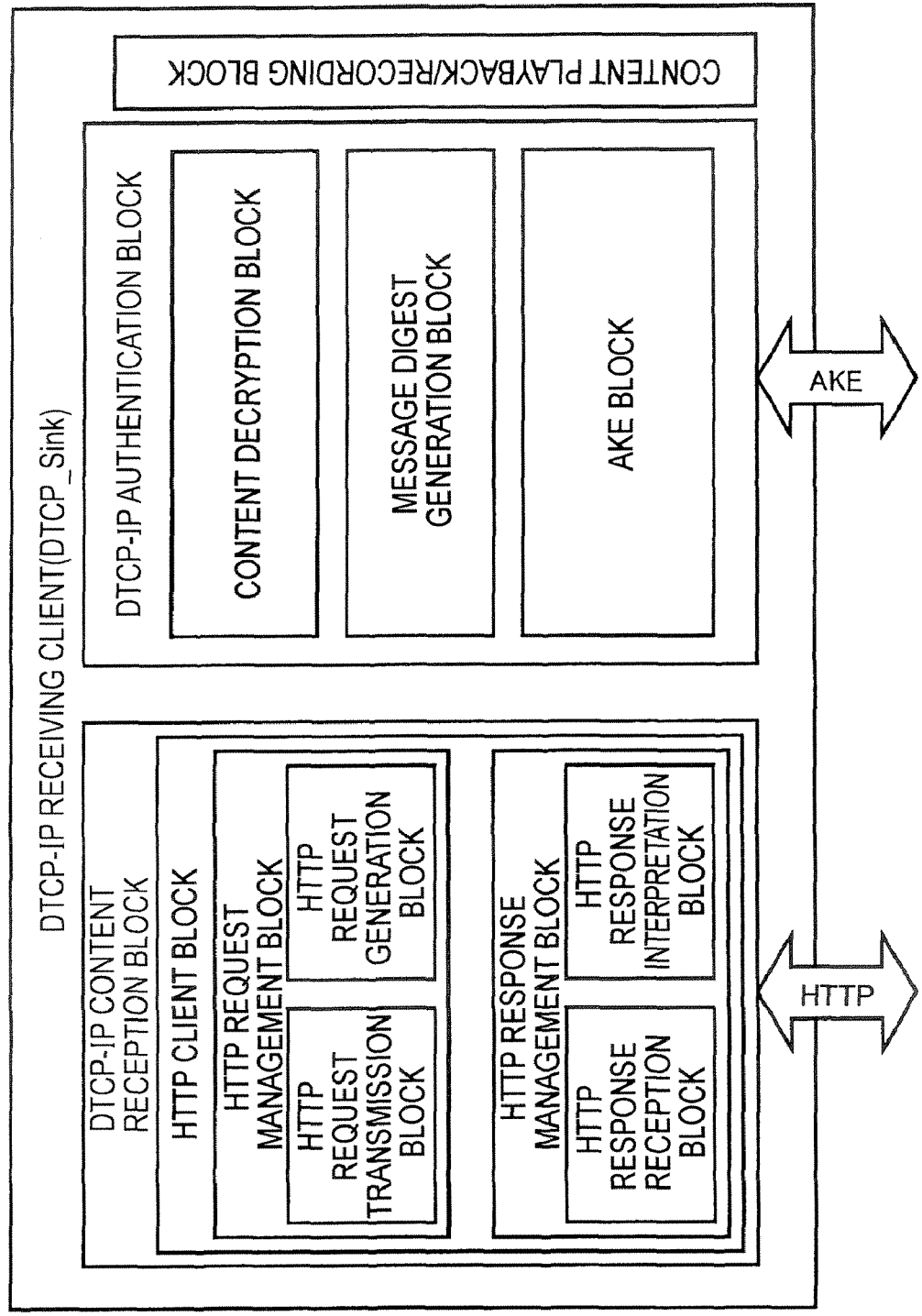
FIG. 2 is a schematic diagram showing a functional structure of an information communication apparatus operating as a client (that is, a sink device) in the information communication system shown in FIG. 1.
Figure 3:
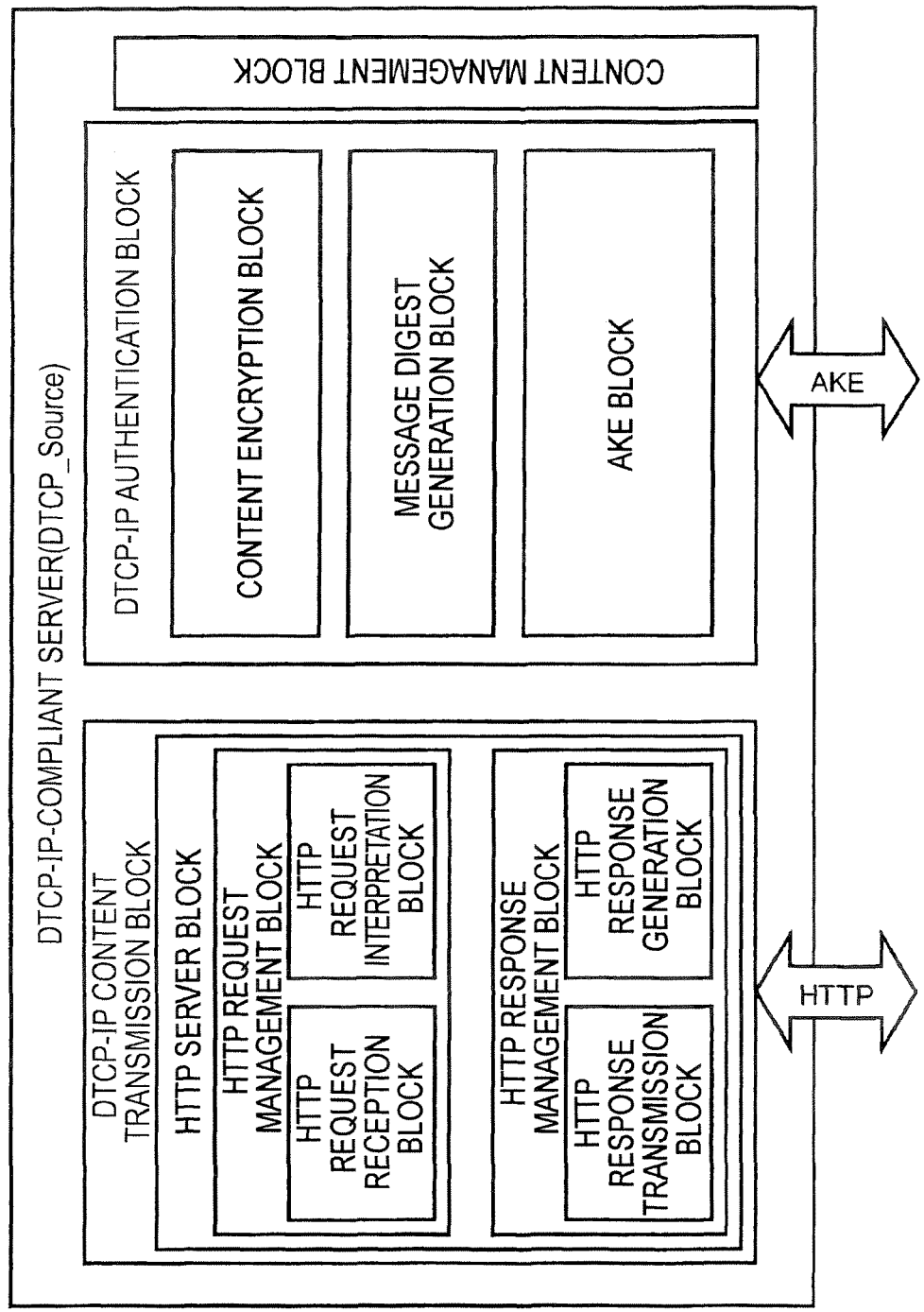
FIG. 3 is a schematic diagram showing a functional structure of an information communication apparatus operating as a server (that is, a source device) in the information communication system shown in FIG. 1.

FIGS. 2 and 3 schematically illustrate functional structures of information communication apparatuses operating as a client (i.e., a sink device) and a server (i.e., a source device) in the information communication system shown in FIG. 1, respectively. The sink device and the source device can establish a connection over a TCP/IP network (not shown), such as the Internet, and can perform an authentication procedure and a content transmission procedure by using the connection.

The information communication apparatuses operating as the sink device and the source device may be designed and manufactured as dedicated hardware apparatuses, or may be implemented by installing a predetermined client application and server application onto a general-purpose computer system, such as a personal computer, and executing the applications, respectively.

The sink device shown in FIG. 2 complies with the DTCP-IP standard, and operates as a DTCP_Sink device. The illustrated client device is provided with functional blocks including a DTCP-IP authentication block, a DTCP-IP content reception block, and a content playback/recording block.

The DTCP-IP authentication block corresponds to authentication procedure executing means, and includes an AKE block, a message digest generation block, and a content decryption block.

The AKE block is a block for implementing an AKE mechanism in DTCP-IP (at the DTCP_Sink side). The AKE block also has a function for forwarding a parameter requested by the message digest generation block, discussed below.

The message digest generation block is a block for generating a message digest in the parameter according to a designated algorithm. A predetermined algorithm may be designated as the algorithm by which the message digest is generated. The predetermined algorithm may be an algorithm associated with a one-way hash function, such as MD5 or SHA-1 (SHA-1 is an improved variant of MD4, like MD5; however, SHA-1 generates a hash value of 160 bits and has higher strength than the MD series).

The message digest generation block is located close to the AKE block so as to generate a message digest in the parameter held by the AKE block, which should not be released outside the DTCP-IP authentication block. The message digest generation block can submit a request to the AKE block to obtain the parameter, and can produce a message digest in the obtained parameter or a parameter given from the outside.

The content decryption block is a block for decrypting the encrypted content data received from the server using a key exchanged by means of AKE. The decrypted content is forwarded to the content playback/recording block.

The content playback/recording block plays back the forwarded content in a playback mode, or stores the content in a recording mode.

The DTCP-IP content reception block is a processing module that executes a content transmission procedure after carrying out AKE. The DTCP-IP content reception block includes an HTTP client block, and serves as an HTTP client to submit a request for content to an HTTP server and to receive the content from the HTTP server in response to the request.

The HTTP client block is divided into an HTTP request management block and an HTTP response management block. The HTTP request management block is further divided into an HTTP request transmission block and an HTTP request generation block.

The HTTP request generation block generates a content transmission request (HTTP request) to be transmitted. The generated HTTP request is transmitted to the server by the HTTP request transmission block.

The HTTP response management block is divided into an HTTP response reception block and an HTTP response interpretation block. An HTTP response and encrypted content returned from the server are received by the HTTP response reception block. The received HTTP response is checked by the HTTP response interpretation block. If the check is good, the received encrypted content is forwarded to the content decryption block. If the check is bad, processing for providing an error response is performed.

The DTCP-IP authentication block and the DTCP-IP content reception block establish separate TCP/IP connections with the server device, and individually perform an authentication procedure and a content transmission procedure.

The source device shown in FIG. 3 complies with the DTCP-IP standard, and operates as a DTCP_Source device. The server device is provided with functional blocks including a DTCP-IP authentication block, a DTCP-IP content transmission block, and a content management block.

The DTCP-IP authentication block corresponds to authentication procedure executing means, and includes an AKE block, a message digest generation block, and a content encryption block.

The AKE block is a block for implementing an AKE mechanism in DTCP-IP (at the DTCP_Source side). The AKE block also has a function for forwarding a parameter requested by the message digest generation block, discussed below. The AKE block holds a corresponding number of pieces of information on authenticated DTCP_Sink devices to the number of authenticated devices, and uses the information to determine whether or not a requesting client is an authenticated client when content is requested.

The message digest generation block is a block for generating a message digest in the parameter according to a designated algorithm. The algorithm by which the message digest is generated may be a predetermined algorithm, e.g., an algorithm associated with a one-way hash function, such as MD5 or SHA-1 (the same as above applies).

The message digest generation block is located close to the AKE block so as to generate a message digest in the parameter held by the AKE block, which should not be released to outside the DTCP-IP authentication block. The message digest generation block can submit a request to the AKE block to obtain the parameter, and can produce a message digest in the obtained parameter or a parameter given from the outside.

The content encryption block is a block for encrypting content data retrieved from the content management block using a key exchanged by means of AKE in response to a request from the DTCP-IP content transmission block. The encrypted content is forwarded to the DTCP-IP content transmission block to transmit the content to the client.

The content management block is a block that manages content to be protected by using the DTCP-IP mechanism. In response to retrieval by the content encryption block, the content management block forwards the data of the content.

The DTCP-IP content transmission block corresponds to content transmission procedure executing means. The DTCP-IP content transmission block includes an HTTP server block, and serves as an HTTP server to receive a request from the client and to execute processing according to the request.

The HTTP server block is divided into an HTTP request management block and an HTTP response management block. The HTTP request management block is further divided into an HTTP request reception block and an HTTP request interpretation block.

The HTTP request reception block receives an HTTP request from the client. The received HTTP request is forwarded to the HTTP request interpretation block to check the request. If the check by the HTTP request interpretation block is good, the DTCP-IP authentication block is notified of the information of the HTTP request.

The HTTP response management block is divided into an HTTP response generation block and an HTTP response transmission block.

The HTTP response generation block produces an HTTP response for returning the encrypted content when the check by the HTTP request interpretation block is good. If the check by the HTTP request interpretation block is bad, the HTTP response generation block produces an HTTP response for returning an error.

The HTTP response transmission block transmits the produced HTTP response to the requesting client. If the check by the HTTP request interpretation block is good, the HTTP response transmission block also transmits the HTTP response header followed by the encrypted content.

The DTCP-IP authentication block and the DTCP-IP content transmission block establish separate TCP/IP connections with a sink device, and individually perform an authentication procedure and a content transmission procedure.

The message digest generation blocks in the DTCP-IP authentication blocks provided for the DTCP-Sink device and the DTCP-Source device are not the function modules specified by DTCP-IP itself, and do not directly relate to the essence of the present invention. For example, Japanese Patent Application No. 2004-113459, assigned to the present assignee, discloses a message digest generation block.

DTCP-IP-Based Content Transmission

In order to perform a DTCP-IP-based content transmission between a source device and a sink device, first, the source device and the sink device establish a single TCP/IP connection, after which the devices authenticate each other by transmitting and receiving AKE commands. The AKE procedure enables a key for encrypting or decrypting content, which is managed by the source device, to be shared between the source device and the sink device.

An AKE command is fundamentally designed to implement a subset of the AV/C General Specification, which is an upper layer protocol of the IEEE 1394 standard. FIG. 4 illustrates a packet format of the AKE command. As illustrated in FIG. 4, the AKE command includes a Type field of 1 byte, a Byte Length of Control (BLC) field of 2 bytes, a Control field of a byte length specified in the BLC field, and an AKE_Info field.

The bytes 0 of the Type, BLC, and Control fields are used to map DTCP to IP. The Type field indicates that the packet for this AKE command is an AKE control packet of version 1.

Ctype/response is a field in which the command type or response code of this AKE command is described, and has the same values as those referenced in Chapter 8 of the DTCP specification and specified by the AV/C Digital Interface Command.

The bytes 1 to 7 of the Control field are identical to operand bytes 0 to 6 as specified in Section 8.3.1, except for the most significant bit (MSB) of byte 7 of the Control field, if they are not used in the IP protocol.

The AKE command can be divided into parts called subfunctions. The subfunctions are described in a "subfunction" field at the sixth byte of the AKE command.

The AKE_Info field is similar to the data field specified in Section 8.3.1.

The AKE_label and source sockets of each control command should be checked to ensure that they are derived from an appropriate controller.

Figure 5:
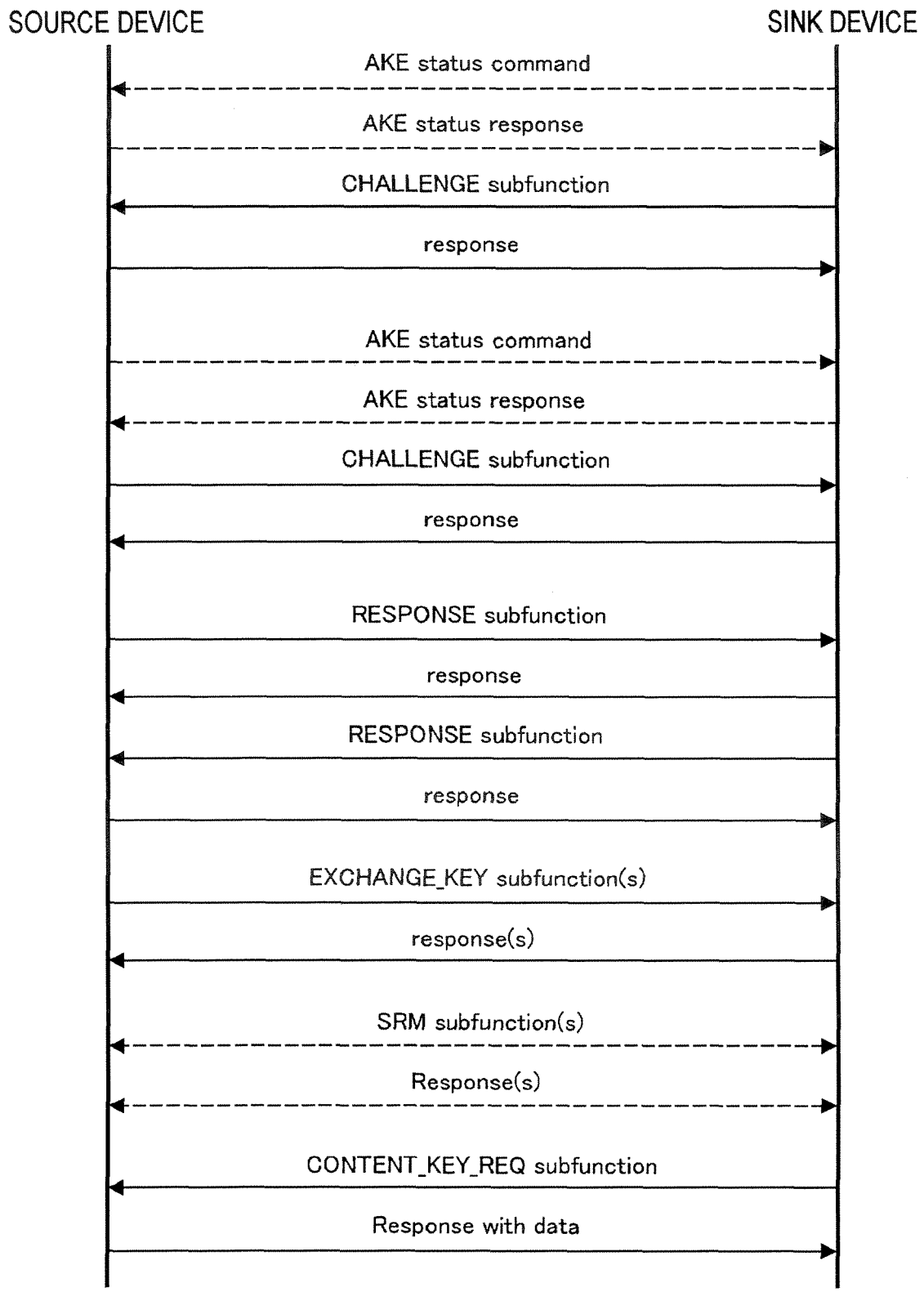
FIG. 5 is a diagram showing an operation sequence for authentication and key exchange using AKE command.

FIG. 5 shows an operation sequence for performing authentication and key exchange using AKE commands. In the sequence, a "request" is used for controlling a device to be targeted, and a "response" is used for identifying a response from the device that has received the "request". An AKE command having a command type is an AKE command request, and an AKE command having a response code is an AKE command response. In DTCP-IP, it is to be noted that an EXCHANGE_KEY subfunction command is an AKE command to be sent only from a source device to a sink device and is not sent in the reverse direction.

An AKE status command is sent from a source device (or sink device) to a sink device (or source device). In response to the AKE status command, an AKE status response is returned from the sink device (or source device). Then, a CHALLENGE subfunction is sent from the source device (or sink device) to the sink device (or source device), and a response is returned from the sink device (or source device) in response to the CHALLENGE subfunction.

Subsequently, a RESPONSE subfunction is sent from the source device (or sink device) to the sink device (or source device), and a response is returned from the sink device (or source device) in response to the RESPONSE subfunction.

Then, an EXCHANGE_KEY subfunction is sent from the source device to the sink device, and a response is returned from the sink device in response to the EXCHANGE_KEY subfunction.

Then, an SRM subfunction is sent from the source device to the sink device, and a response is returned from the sink device in response to the SRM subfunction.

Subsequently, a CONTENT_KEY_REQ subfunction is sent from the source device to the sink device, and a response is returned from the sink device in response to the CONTENT_KEY_REQ subfunction.

In DTCP-IP, although the trigger method for AKE is not defined, information for triggering AKE (hereinafter also referred to as "AKE trigger information") is defined. The AKE trigger information is defined in the form that includes a set of an IP address and port number of the source device at which AKE is accepted. The AKE trigger information is forwarded from the source device to the sink device, after which a TCP connection is established from the sink device to the source device based on the AKE trigger information, thereby triggering AKE. As is obvious from the nature of the AKE trigger information, the source device generally attempts to establish a TCP connection to the sink device.

In the following description, it is assumed that the source device passes the trigger of AKE to the sink device over the network (actually, the trigger is passed using a Universal Plug and Play (UPnP) CDS). It is also assumed that the source device is ready to accept AKE from the sink device before the AKE trigger information is passed from the source device to the sink device.

After performing an AKE procedure between DTCP-compliant devices, the sink device requests the source device to provide content. The source device can notify in advance the sink device of the content location for accessing the content on the source device via a CDS or the like. The sink device may use a protocol, such as HTTP or RTP, to request the content.

For example, the source device serves an HTTP server and the sink device serves as an HTTP client, between which the transmission of the content is initiated. In this case, a TCP/IP connection for HTTP, which is separate from the TCP/IP connection for DTCP authentication, is created by the HTTP client. The HTTP client requests content on the HTTP server according to a similar operation procedure to the normal HTTP procedure. In response to the request, the HTTP server returns the requested content as an HTTP response. The data transmitted as the HTTP response is data into which the HTTP server, i.e., the source device, encrypts the content using a key shared through the AKE authentication. Upon receiving the encrypted data, the client, i.e., the sink device, decrypts the data using the key shared through the above-described authentication to play back or record the content.

Accordingly, DTCP-IP can provide a secure content transmission protocol even over an IP network, which enables the content to be protected against eavesdropping or tampering in the middle of the transmission line by sharing a key between authenticated devices and encrypting and decrypting transmission content.

Limit of Range of Content Transmission by TTL Check

In the IP protocol, it is defined that an IP router, when forwarding an IP packet, should decrement the TTL field value embedded in the IP header by 1 and should not propagate over the network (should discard) an IP packet whose TTL field value has expired.

In DTCP-IP, it is further defined that, when sending an IP packet as an AKE command, the TTL field value is set to 3 or less. It is also defined that, when receiving an IP packet as an AKE command, the IP packet is discarded if the TTL field value of the IP packet exceeds 3. This is because the number of router hops between the user and the other party between which the transmission and reception of AKE commands, i.e., key exchange, is carried out is limited to 3 or less so that the use of content is substantially limited to personal or home use.

Although the existing IP protocol has a function for discarding an IP packet whose TTL field value has expired due to multiple routers hops, an IP packet whose TTL field value exceeds a predetermined value is not discarded. Therefore, a unique TCP/IP protocol is developed or the code corresponding to the kernel of the OS installing TCP/IP is modified so that the DTCP application can check the TTL field value whenever receiving an IP packet carrying an AKE command and can discard an IP packet whose TTL field value exceeds a predetermined value, which is time-consuming.

In this embodiment, instead of checking the TTL field value each time receiving an AKE command to determine one-by-one whether or not the received packet is to be discarded, a DTCP-IP-compliant information communication device monitors the TTL field values written in the headers of the IP packets received over a period of time from the start of the AKE procedure to immediately before the end, and continuously updates the maximum TTL field value. Immediately before performing key exchange, it is checked whether or not the maximum TTL field value does not exceed 3. If the maximum value exceeds 3, the DTCP-IP application terminates the subsequent key exchange processing.

For example, the DTCP-IP application may use a library, such as libpcap, to monitor AKE commands to obtain the TTL field values of the IP headers. Thus, there is no need for operations, such as uniquely developing the TCP/IP protocol layer or modifying the OS. Libpcap is a library for Linux, and is referred to, for example, http://www.tcpdump.org/.

Figure 6:
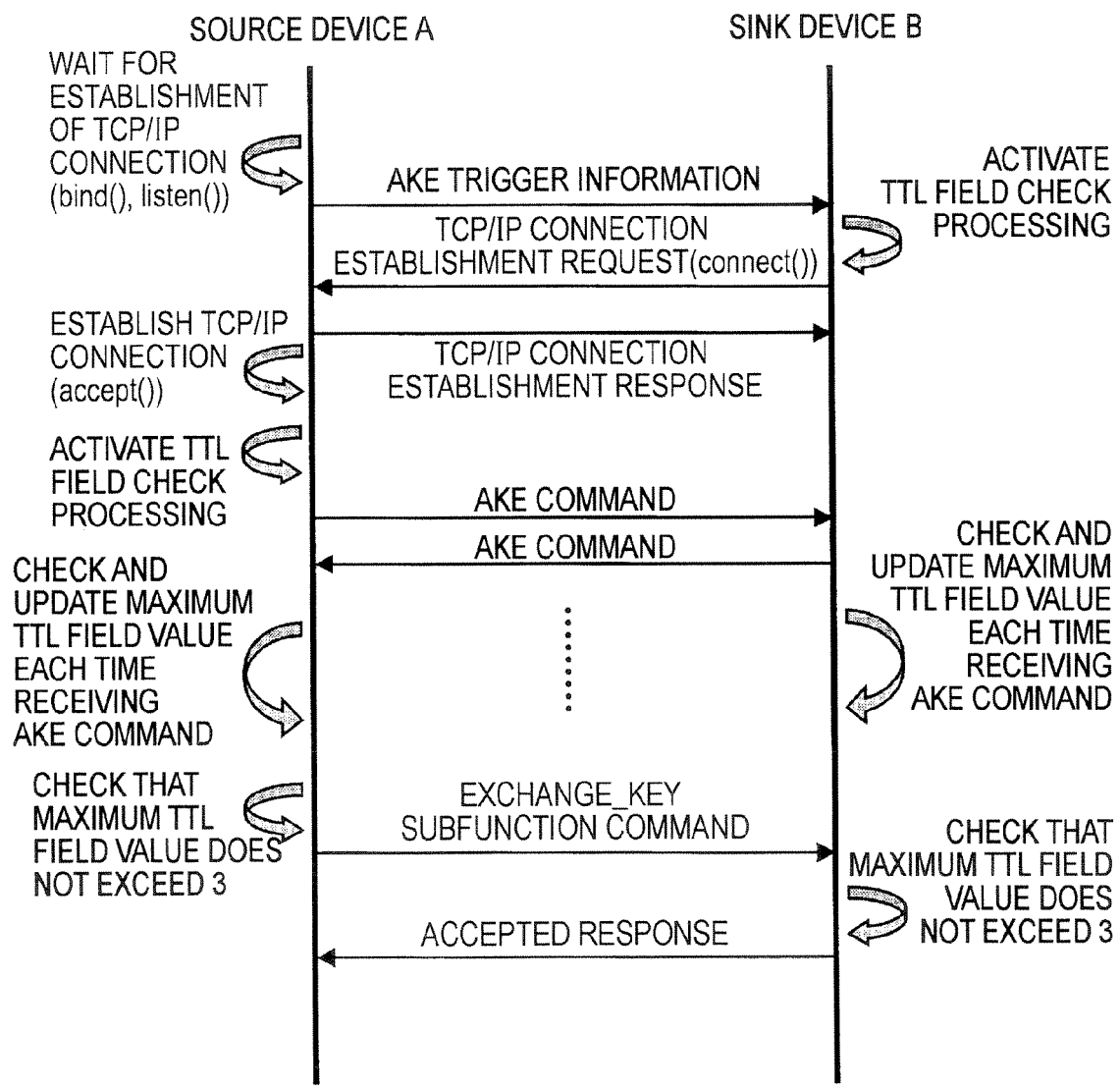
FIG. 6 is a diagram showing an example operation sequence for performing an authentication and key exchange (AKE) procedure in accordance with DTCP-IP between a source device A and a sink device B.

FIG. 6 illustrates an example operation sequence for performing an authentication and key exchange (AKE) procedure in accordance with DTCP-IP between a source device A and a sink device B. In the illustrated example, the number of router hops between the source device A and the sink device B is set to 3 or less, and each of the devices sends an AKE command whose TTL field value is set to 3 so that the AKE command reaches the other device without being discarded in the middle of transmission, whereby the procedure can successfully be performed. It is assumed that the source device A passes the trigger of AKE to the sink device B over the network and that the source device A is ready to accept AKE from the sink device B before the AKE trigger information is passed from the source device A to the sink device B.

The source device A is switched to a mode in which it can receive a TCP connection establishment request at the port number designated in the AKE trigger information. Specifically, the source device A creates a socket object to execute a bind( ) method and a listen( ) method, and is switched to a mode in which it waits for a connect( ) request from the sink device B.

Subsequently, the source device A passes the AKE trigger information to the sink device B.

Upon receiving the AKE trigger information, the sink device B prepares for establishment of a TCP connection, and activates a process for checking a TTL field value of an IP packet. Specifically, the sink device B creates a socket object, and activates the TTL field value checking process in association with the socket.

Then, the sink device B uses the IP address and port number designated in the AKE trigger information to issue a TCP connection establishment request to the source device A. Specifically, the sink device B executes the connect( ) method.

Upon receiving the TCP connection establishment request from the sink device B, the source device A establishes a TCP connection, and activates a process for checking a TTL field value of an IP packet to enter a mode in which the source device A can perform TCP/IP communication with the sink device B. Specifically, the source device A executes the accept( ) method to obtain the socket object, and activates the TTL field value checking process in association with the socket to enter a mode in which the source device A can transmit and receive byte data to and from the sink device B by the recv( )/send( ) method.

Thus, the sink device B is switched to a mode in which it can perform TCP/IP communication with the source device A. Specifically, the sink device B is switched to a mode in which it can transmit and receive the byte data to and from the source device A by the recv( )/send( ) method with respect to the socket object created when the source device A is switched to the mode in which it can receive the TCP connection establishment request.

For a period of time from this point to immediately before the end of the authentication and key exchange procedure by means of AKE, the source device A and the sink device B transmit and receive the AKE commands specified by DTCP-IP AKE. The period of time up to immediately before the end of AKE corresponds to a period of time until the source device A is ready to send an EXCHANGE_KEY subfunction command, and corresponds to a period of time until the sink device B receives the EXCHANGE_KEY subfunction command.

That is, each of the source device A and the sink device B timely performs processing on the received AKE command to obtain the TTL field value from the header of the IP packet carrying the AKE command, and compares the obtained TTL field value with the maximum TTL field value stored therein (hereinafter referred to as a "maximum stored TTL field value"). If the TTL field value for the received AKE command is larger, the maximum stored TTL field value is updated to the value. If the maximum stored TTL field value is larger, nothing is done. Each of the source device A and the sink device B repeatedly performs the processing described above each time receiving an AKE command.

The source device A checks whether the maximum stored TTL field value does not exceed 3 immediately before sending an EXCHANGE_KEY subfunction command.

If the maximum stored TTL field value exceeds 3, this means that the TTL field value for at least some of the AKE commands received from the sink device at the other end of the connection exceeds 3, that is, the sink device is located at a position where the number of router hops exceeds 3. Thus, in order to meet the DTCP-IP specification in which the TTL field value is set to 3 or less to and an IP packet whose TTL field value exceeds 3 is discarded, according to this embodiment, the source device A does not send an EXCHANGE_KEY subfunction command, and terminates the AKE procedure due to authentication failure. Therefore, the authentication with the sink device B is not successfully completed, and a key for encrypting and decrypting transmission content is not shared, thereby achieving similar advantages to those when any received AKE command is discarded.

Methods for notifying the sink device B of authentication failure include a method to "disconnect the established TCP connection" and a method to "transmit an AKE_CANCEL subfunction command to the sink device B". The notified sink device B does not activate a re-transmission procedure for the IP packet carrying the AKE command.

If the maximum stored TTL field value does not exceed 3, this means that the TTL field value for any of the AKE commands received from the sink device B at the other end of the connection does not exceed 3, that is, the sink device B is located at a position where the number of router hops is 3 or less. In this case, the DTCP-IP rule in which the TTL field value is set to 3 or less is not violated, and the source device A sends an EXCHANGE_KEY subfunction command to continue the subsequent processing.

Likewise, immediately after receiving the EXCHANGE_KEY subfunction command, the sink device B checks whether the maximum stored TTL field value does not exceed 3.

If the maximum stored TTL field value exceeds 3, this means that the TTL field value for at least some of the AKE commands received from the source device at the other end of the connection exceeds 3, which violates the DTCP-IP rule. Thus, the IP packet whose TTL field value exceeds 3 is discarded. In this embodiment, the sink device B sends a REJECTED response, and terminates the AKE procedure. Alternatively, the sink device B may directly perform processing, such as disconnecting the TCP connection, without sending the REJECTED response. Therefore, the authentication with the source device A is not successfully completed, and a key for encrypting and decrypting transmission content is not shared, thereby achieving similar advantages to those when any received AKE command is discarded.

If the maximum stored TTL field value does not exceed 3, this means that the TTL field value for any of the AKE commands received from the source device A at the other end of the connection does not exceed 3, that is, the source device A is located at a position where the number of router hops is 3 or less. In this case, the DTCP-IP rule in which the TTL field value is set to 3 or less is not violated, and the sink device B sends an ACCEPTED response in response to the EXCHANGE_KEY subfunction command, and continues the subsequent processing.

In order to monitor TTL field values over a period of time during which AKE commands are transmitted and received, instead of monitoring IP packets to successively obtain the TTL field values and storing only the maximum TTL field value, the TTL field values of all IP packets received over the period of time may be stored and checked.

Figure 7:
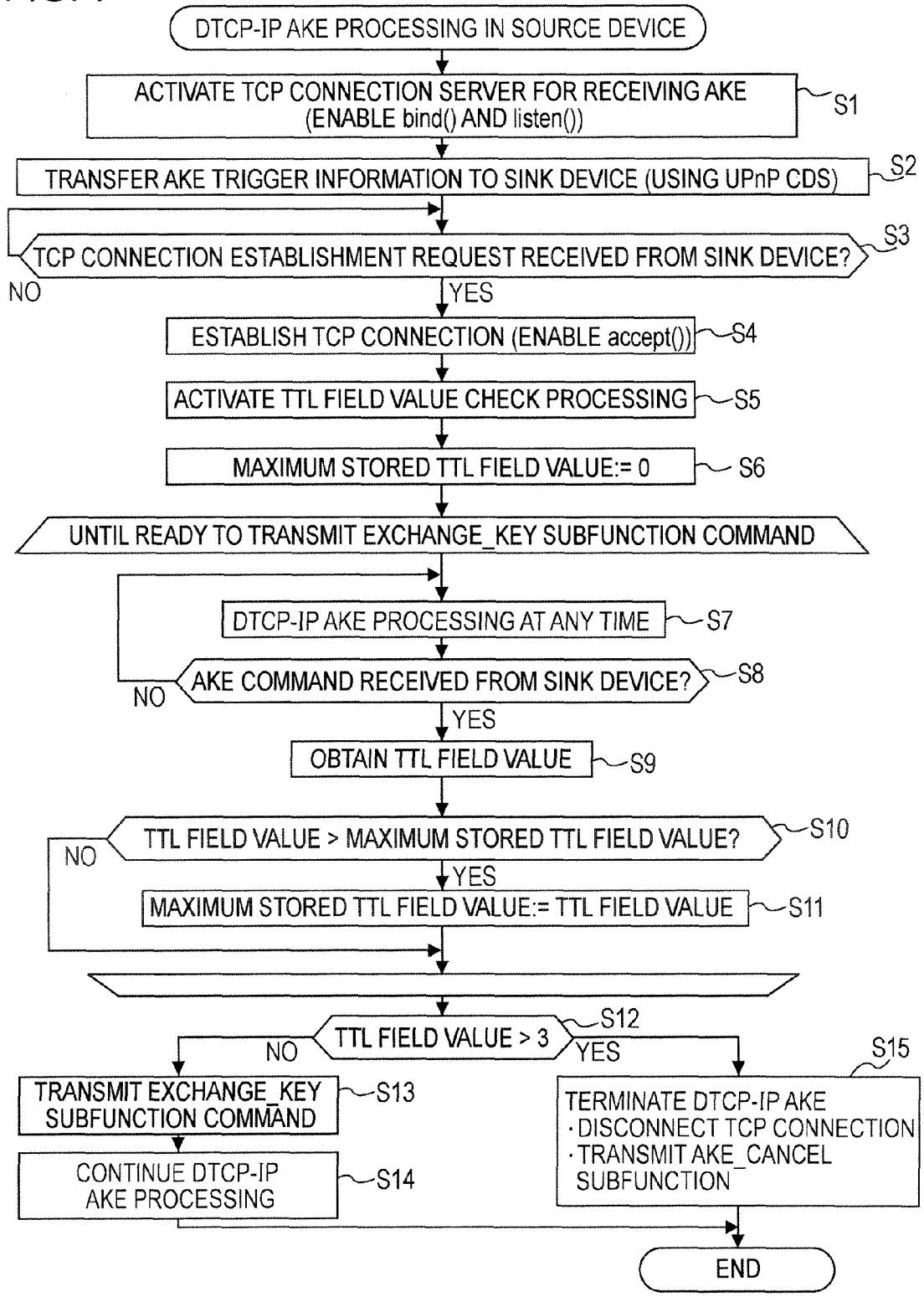
FIG. 7 is a flowchart showing a processing procedure for the source device to perform an authentication and key exchange (AKE) procedure while checking that the TTL field value of the IP packet carrying the AKE command does not exceed 3.

FIG. 7 is a flowchart showing a processing procedure for a source device to perform an authentication and key exchange (AKE) procedure while checking that a TTL field value of an IP packet carrying an AKE command does not exceed 3. It is assumed that the source device is ready to accept AKE from a sink device before the AKE trigger information is passed from the source device to the sink device.

The source device is switched to a mode in which it can receive a TCP connection establishment request at the port number designated in the AKE trigger information (step S1). Specifically, the source device creates a socket object to execute the bind( ) method and the listen( ) method, and is switched to a mode in which it waits for a connect( ) request from the sink device.

Then, the source device passes the AKE trigger information to the sink device using UPnP CDS or the like (step S2).

Upon receiving the TCP connection establishment request from the sink device (step S3), the source device establishes a TCP connection (step S4). Then, the source device activates a process for checking a TTL field value of an IP packet (step S5), and enters a mode in which it can perform TCP/IP communication with the sink device. Specifically, the source device executes the accept( ) method to obtain the socket object, and activates the TTL field value checking process in association with the socket to enter a mode in which it can transmit and receive byte data to and from the sink device by the recv( )/send( ) method. At this time, initial value 0 is substituted into the maximum stored TTL field value (step S6).

Thus, the sink device is switched to a mode in which it can perform TCP/IP communication with the source device. Specifically, the sink device is switched to a mode in which it can transmit and receive the byte data to and from the source device by the recv( )/send( ) method with respect to the socket object created when the source device is switched to the mode in which it can receive the TCP connection establishment request.

For a period of time from this point to immediately before the end of the authentication and key exchange procedure by means of AKE, or until the source device is ready to send an EXCHANGE_KEY subfunction command, the source device repeatedly performs the processing of steps S7 to S11 to transmit and receive the AKE commands specified by DTCP-IP AKE.

That is, upon receiving an AKE command (step S8), the source device timely performs processing on the AKE command (step S7) to obtain the TTL field value from the header of the IP packet carrying the AKE command (step S9), and compares the obtained TTL field value with the maximum TTL field value stored therein (hereinafter referred to as a "maximum stored TTL field value") (step S10). If the TTL field value for the received AKE command is larger, the maximum stored TTL field value is updated to the value (step S11). The source device repeatedly performs the processing described above each time receiving an AKE command.

When the source device is ready to transmit an EXCHANGE_KEY subfunction command, the source device checks whether the maximum stored TTL field value does not exceed 3 (step S12).

If the maximum stored TTL field value does not exceed 3, this means that the TTL field value for any of the AKE commands received from the sink device at the other end of the connection does not exceed 3, that is, the sink device is located at a position where the number of router hops is 3 or less. In this case, the DTCP-IP rule in which the TTL field value is set to 3 or less is not violated, and the source device sends an EXCHANGE_KEY subfunction command (step S13), and continues the subsequent DTCP-IP AKE processing (step S14). Then, the processing routine ends.

If the maximum stored TTL field value exceeds 3 in the processing procedure until the source device is ready to send an EXCHANGE_KEY subfunction command (step S12), this means that the TTL field value for at least some of the AKE commands received from the sink device at the other end of the connection exceeds 3, which violates the DTCP-IP rule, and an IP packet whose TTL field value exceeds 3 is discarded.

The source device does not send an EXCHANGE_KEY subfunction command, and terminates the AKE procedure due to authentication failure (step S15). Specifically, the source device disconnects the established TCP connection, or transmits an AKE_CANCEL subfunction command to the sink device. Then, the processing routine ends. Therefore, the authentication with the sink device is not successfully completed, and a key for encrypting and decrypting transmission content is not shared, thereby achieving similar advantages to those when any received AKE command is discarded.

Figure 8:
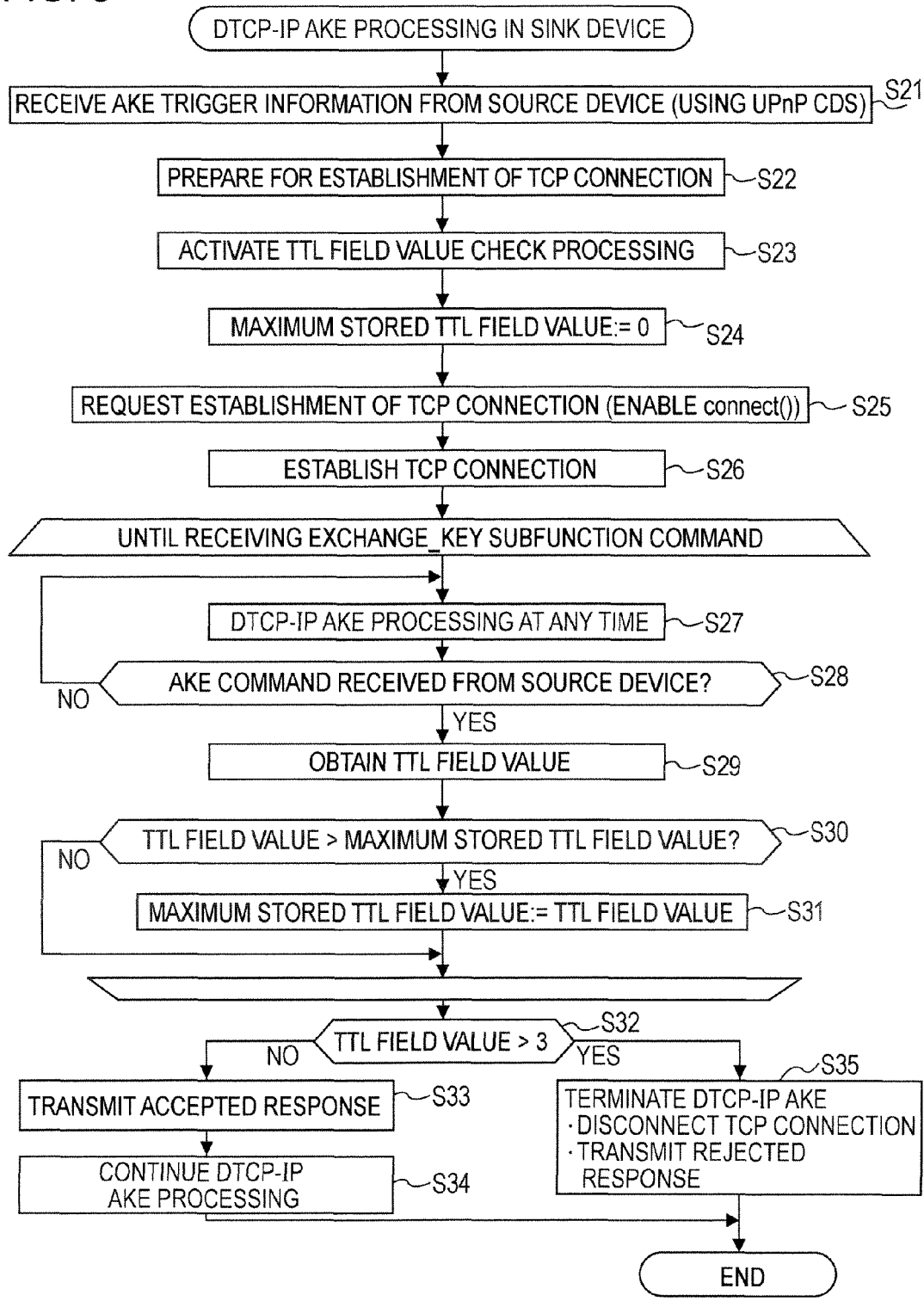
FIG. 8 is a flowchart showing a processing procedure for the sink device to perform an authentication and key exchange (AKE) procedure while checking that the TTL field value of the IP packet carrying the AKE command does not exceed 3.

FIG. 8 is a flowchart showing a processing procedure for a sink device to perform an authentication and key exchange (AKE) procedure while checking that a TTL field value of an IP packet carrying an AKE command does not exceed 3. It is assumed that a source device is ready to accept AKE from the sink device before the AKE trigger information is passed from the source device to the sink device.

First, upon receiving AKE trigger information from the source device using UPnP CDS or the like (step S21), the sink device prepares for establishment of a TCP connection (step S22). Then, the sink device activates a process for checking a TTL field value of an IP packet (step S23). Specifically, the sink device creates a socket object, and activates the TTL field value checking process in association with the socket. At this time, initial value 0 is substituted into the maximum stored TTL field value (step S24).

Then, the sink device uses the IP address and port number designated in the AKE trigger information to issue a TCP connection establishment request to the source device (step S25). Specifically, the sink device executes the connect( ) method.

Thus, the sink device is switched to a mode in which it can perform TCP/IP communication with the source device. Specifically, the sink device is switched to a mode in which it can transmit and receive byte data to and from the source device by the recv( )/send( ) method with respect to the socket object created when the source device is switched to the mode in which it can receive the TCP connection establishment request.

For a period of time from this point to immediately before the end of the authentication and key exchange procedure by means of AKE, or until the sink device receives the EXCHANGE_KEY subfunction command, the sink device repeatedly performs the processing of steps S27 to S31 to transmit and receive the AKE commands specified by the DTCP-IP AKE.

That is, upon receiving an AKE command (step S28), the sink device timely performs processing on the AKE command (step S27) to obtain the TTL field value from the header of the IP packet carrying the AKE command (step S29), and compares the obtained TTL field value with the maximum TTL field value stored therein (hereinafter referred to as a "maximum stored TTL field value") (step S30). If the TTL field value for the received AKE command is larger, the maximum stored TTL field value is updated to the value (step S31). The sink device repeatedly performs the processing described above each time receiving an AKE command.

Immediately after receiving the EXCHANGE_KEY subfunction command, the sink device checks whether the maximum stored TTL field value does not exceed 3 (step S32).

If the maximum stored TTL field value does not exceed 3, this means that the TTL field value for any of the AKE commands received from the source device at the other end of the connection does not exceed 3, that is, the source device is located at a position where the number of router hops is 3 or less. In this case, the DTCP-IP rule in which the TTL field value is set to 3 or less is not violated, and the sink device sends an ACCEPTED response in response to the EXCHANGE_KEY subfunction command (step S33), and continues the subsequent DTCP-IP AKE processing (step S34). Then, the processing routine ends.

If the maximum stored TTL field value exceeds 3 in the processing procedure until the sink device receives the EXCHANGE_KEY subfunction command (step S32), this means that the TTL field value for at least some of the AKE commands received from the source device at the other end of the connection exceeds 3, which violates the DTCP-IP rule, and an IP packet whose TTL field value exceeds 3 is discarded.

Thus, the sink device terminates the AKE procedure (step S35). Specifically, the sink device performs processing, such as transmitting a REJECTED response or directly disconnecting the TCP connection without transmitting a REJECTED response. Therefore, the authentication with the source device is not successfully completed, and a key for encrypting and decrypting transmission content is not shared, thereby achieving similar advantages to those when any received AKE command is discarded.

The present invention has been described in detail in the context of a specific embodiment. However, it is to be understood that modifications or alternatives to the embodiment could be made by those skilled in the art without departing from the scope of the present invention.

While an embodiment in which AKE commands for authentication and key exchange (AKE) are transmitted and received between DTCP-IP-compliant information communication devices has been described by way of example, the present invention is not limited to this embodiment. Any other information communication system in which information content to be protected by copyright is transmitted over an IP network or any other information communication system in which the number of router hops is limited by using the TTL field value written in the header of an IP packet to limit the range of parties between which the information can be communicated to a predetermined range may also fall within the scope of the present invention.

While the TTL field in the IP header, which is specified by IPv4, is used herein to limit the number of router hops, the present invention is not limited thereto, and other control information that describes the number of router hops in a packet may be used.

Figure 9:
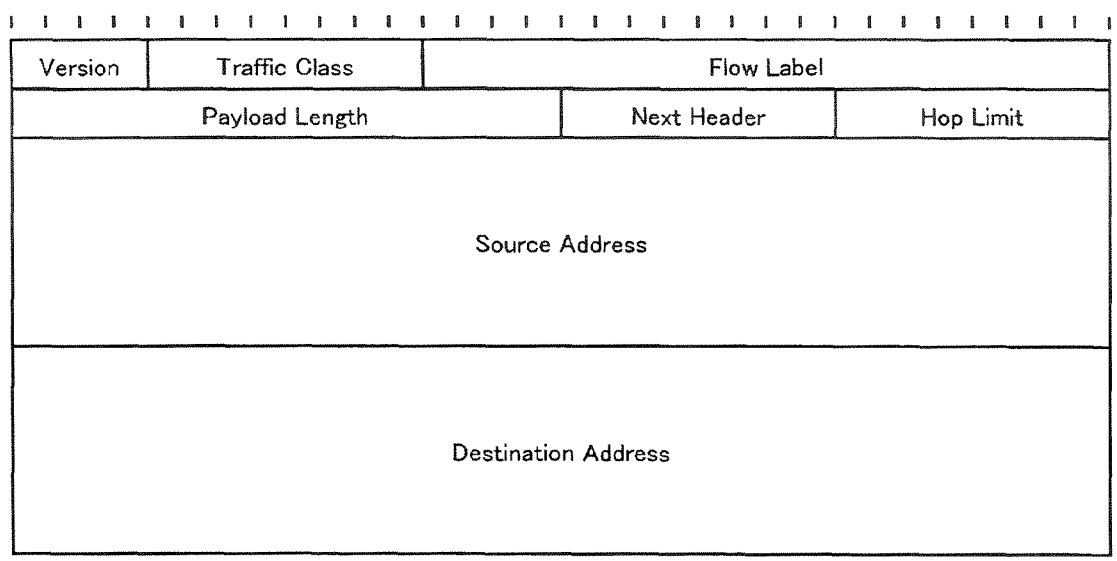
FIG. 9 is a diagram showing the header structure defined by IPv6.

Beside the TTL field, the Hop Limit field value in the IP header, which is specified by IPv6, may be used (see, for example, RFC 2460 Internet Protocol, Version 6 (IPv6) Specification). For the convenience of reference, the header structure specified by IPv6 is illustrated in FIG. 9. The Hop Limit field is composed of an 8-bit unsigned integer, and decrements by 1 each time an IP packet is transferred at a node. An IP packet whose Hop Limit value has expired is discarded at this node. (The Hop Limit field for IPv6 has substantially the same function as that of the TTL field for IPv4. While the Hop Limit field for IPv6 can only designate the maximum number of hops through which a packet to be transferred between nodes can pass, and does not designate time, the TTL field for IPv4 can designate not only the number of hops but also the number of seconds.)

In summary, the present invention has been disclosed by way of exemplary embodiments, and the contents disclosed herein should not be restrictively construed. The scope of the present invention should be determined in consideration of the appended claims.

It should be understood by those skilled in the art that various modifications, combinations, sub-combinations and alterations may occur depending on design requirements and other factors insofar as they are within the scope of the appended claims or the equivalents thereof.

What is claimed is:

1. An information communication system comprising:
a plurality of information communication devices, including a processor, exchanging IP packets over IP networks, when performing a predetermined packet exchanging procedure in which the number of router hops is limited to a predetermined control value or less, each of the information communication devices is configured to monitor current Time-To-Live values and maximum Time-To-Live values designated in the headers of IP packets received over a period of time from the start of the predetermined packet exchanging procedure to immediately before the end of the predetermined packet exchanging procedure, said devices further configured to continuously increase the maximum Time-To-Live value to be equal to the current Time-To-Live value if the current Time-To-Live value is greater than the maximum Time-To-Live value such that each time the current Time-To-Live value exceeds the maximum Time-To-Live value, the devices increase the maximum Time-To-Live value to be equal to the current Time-To-Live value, and checks whether the maximum Time-To-Live value does not exceed the control value, the predetermined packet exchanging procedure including an authentication and key exchange procedure in accordance with DTCP-IP, and each of the information communication devices monitors the current Time-To-Live values and the maximum Time-to-Live values in the headers of IP packets carrying authentication-and-key-exchange commands.

2. The information communication system according to claim 1, wherein each of the information communication devices checks whether the maximum Time-To-Live value does not exceed the control value immediately before the end of the predetermined packet exchanging procedure; when the maximum Time-To-Live value is equal to or less than the control value, each of the information communication devices performs subsequent packet transmission and reception processing to complete the predetermined packet exchanging procedure; and when the maximum Time-To-Live value exceeds the control value, each of the information communication devices terminates the predetermined packet exchanging procedure without performing the subsequent packet transmission and reception processing.

3. The information communication system according to claim 1, wherein the information communication devices include a source device and a sink device; when the source device distributes content to the sink device according to DTCP-IP, the source device monitors, from immediately after a TCP connection for transmitting and receiving authentication-and-key-exchange commands is established, IP packets transmitted and received over the TCP connection to obtain the current Time-To-Live values and the maximum Time-to-Live values of the IP packets to continuously update the maximum Time-To-Live value, and checks whether or not the maximum Time-To-Live value is equal to or less than the control value immediately before transmitting an Exchange_Key subfunction command; when the maximum Time-To-Live value is equal to or less than the control value, the source device proceeds to transmit the Exchange_Key subfunction command; and when the maximum Time-To-Live value exceeds the control value, the source device terminates the authentication and key exchange procedure without transmitting the Exchange_Key subfunction command.

4. The information communication system according to claim 1, wherein the information communication devices include a source device and a sink device; when the sink device obtains content from the source device according to DTCP-IP, the sink device monitors, from immediately before a TCP connection for transmitting and receiving authentication-and-key-exchange commands is established, IP packets transmitted and received over the TCP connection to obtain the current Time-To-Live values and the maximum Time-to-Live values of the IP packets to continuously update the maximum Time-To-Live value, and checks whether or not the maximum Time-To-Live value is equal to or less than the control value immediately after receiving an Exchange_Key subfunction command; when the maximum Time-To-Live value is equal to or less than the control value, the sink device proceeds to transmit an ACCEPTED response in response to the Exchange_Key subfunction command; and when the maximum Time-To-Live value exceeds the control value, the sink device immediately terminates the authentication and key exchange procedure.

5. An information communication apparatus that exchanges IP packets with a second information communication apparatus over an IP network, the information communication apparatus comprising:
  IP header monitoring means for, when performing a predetermined packet exchanging procedure in which the number of router hops is limited to a predetermined control value or less, monitoring current Time-To-Live values and maximum Time-To-Live values designated in the headers of IP packets received over a monitoring time from the start of the predetermined packet exchanging procedure to immediately before the end of the predetermined packet exchanging procedure, the predetermined packet exchanging procedure comprises an authentication and key exchange procedure in accordance with DTCP-IP, and the IP header monitoring means monitors current Time-To-Live values and maximum Time-To-Live values in headers of IP packets carrying authentication-and-key-exchange commands;
  maximum Time-To-Live value updating means for storing updated maximum Time-To-Live values, the maximum Time-To-Live value updating means continuously increasing the maximum Time-To-Live value to be equal to the current Time-To-Live value if the current Time-To-Live value is greater than the maximum Time-To-Live value during the monitoring time such that each time the current Time-To-Live value exceeds the maximum Time-To-Live value, the maximum Time-To-Live value updating means increases the maximum Time-To-Live value to be equal to the current Time-To-Live value; and
  Time-To-Live value checking means for checking whether the maximum Time-To-Live value does not exceed the control value.

6. The information communication apparatus according to claim 5, further comprising:
  packet exchanging procedure controlling means for performing subsequent packet transmission and reception processing to complete the predetermined packet exchanging procedure when the Time-To-Live value checking means determines that the maximum Time-To-Live value is equal to or less than the control value, and for terminating the predetermined packet exchanging procedure without performing the subsequent packet transmission and reception processing when the Time-To-Live value checking means determines that the maximum Time-To-Live value exceeds the control value.

7. The information communication apparatus according to claim 5, wherein the information communication apparatus is a source device, and the second information communication apparatus is a sink device; when the information communication apparatus distributes content to the second information communication apparatus according to DTCP-IP, the IP header monitoring means monitors, from immediately after a TCP connection for transmitting and receiving authentication-and-key-exchange commands is established, IP packets transmitted and received over the TCP connection to obtain the current Time-To-Live values and maximum Time-To-Live values of the IP packets; the maximum Time-To-Live value updating means continuously updates the maximum Time-To-Live value; the Time-To-Live value checking means checks whether or not the maximum Time-To-Live value is equal to or less than the control value immediately before an Exchange_Key subfunction command is transmitted; and the packet exchanging procedure controlling means proceeds to transmit the Exchange_Key subfunction command when the maximum Time-To-Live value is equal to or less than the control value, and terminates the authentication and key exchange procedure without transmitting the Exchange_Key subfunction command when the maximum Time-To-Live value exceeds the control value.

8. The information communication apparatus according to claim 5, wherein the information communication apparatus is a sink device, and the second information communication apparatus is a source device; when the information communication apparatus obtains content from the second information communication apparatus according to DTCP-IP, the IP header monitoring means monitors, from immediately before a TCP connection for transmitting and receiving authentication-and-key-exchange commands is established, IP packets transmitted and received over the TCP connection to obtain the current Time-To-Live values and maximum Time-To-Live values of the IP packets; the maximum Time-To-Live value updating means continuously updates the maximum Time-To-Live value; the Time-To-Live value checking means checks whether or not the maximum Time-To-Live value is equal to or less than the control value immediately after an Exchange_Key subfunction command is received; and the packet exchanging procedure controlling means proceeds to transmit an ACCEPTED response in response to the Exchange_Key subfunction command when the maximum Time-To-Live value is equal to or less than the control value, and immediately terminates the authentication and key exchange procedure when the maximum Time-To-Live value exceeds the control value.

9. An information communication method for an information communication apparatus to exchange IP packets with a second information communication apparatus over an IP network, the information communication method comprising:
  when performing a predetermined packet exchanging procedure in which the number of router hops is limited to a predetermined control value or less, monitoring, using a processor, current Time-To-Live values and maximum Time-To-Live values designated in the headers of IP packets received over a monitoring time from the start of the predetermined packet exchanging procedure to immediately before the end of the predetermined packet exchanging procedure, the predetermined packet exchanging procedure including an authentication and key exchange procedure in accordance with DTCP-IP, and the monitoring including monitoring the current Time-To-Live values and the maximum Time-to-Live values in the headers of IP packets carrying authentication-and-key-exchange commands;

continuously increasing the maximum Time-To-Live value to be equal to the current Time-To-Live value if the current Time-To-Live value is greater than the maximum Time-To-Live value during the monitoring time such that each time the current Time-To-Live value exceeds the maximum Time-To-Live value, the maximum Time-To-Live value is increased to be equal to the current Time-To-Live value;

checking whether the maximum Time-To-Live value does not exceed the control value;

continuing the predetermined packet exchanging procedure by performing subsequent packet transmission and reception processing to complete the predetermined packet exchanging procedure when the maximum Time-To-Live value of Time-To-Live values extracted from packets monitored over a period of time from the start of the predetermined packet exchanging procedure to immediately before the end of the predetermined packet exchanging procedure is equal to or less than the control value; and terminating the predetermined packet exchanging procedure without performing the subsequent packet transmission and reception processing when the maximum Time-To-Live value of Time-To-Live values extracted from packets monitored over a period of time from the start of the predetermined packet exchanging procedure to immediately before the end of the predetermined packet exchanging procedure exceeds the control value.

10. The information communication method according to claim 9, wherein the information communication apparatus is a source device, and the second information communication apparatus is a sink device; when distributing content to the second information communication apparatus according to DTCP-IP, in the monitoring, from immediately after a TCP connection for transmitting and receiving authentication-and-key-exchange commands is established, IP packets transmitted and received over the TCP connection are monitored to obtain the current Time-To-Live values and maximum Time-To-Live values of the IP packets; in the continually increasing, the maximum Time-To-Live value is continuously updated; in the checking, it is checked whether or not the maximum Time-To-Live value is equal to or less than the control value immediately before an Exchange_Key subfunction command is transmitted; in the continuing, the Exchange_Key subfunction command is transmitted when the maximum Time-To-Live value is equal to or less than the control value; and in the terminating, the predetermined packet exchanging procedure is terminated without transmitting the Exchange_Key subfunction command when the maximum Time-To-Live value exceeds the control value.

11. The information communication method according to claim 9, wherein the information communication apparatus is a sink device, and the second information communication apparatus is a source device; when obtaining content from the second information communication apparatus according to DTCP-IP, in the monitoring, from immediately before a TCP connection for transmitting and receiving authentication-and-key-exchange commands is established, IP packets transmitted and received over the TCP connection are monitored to obtain the current Time-To-Live values and maximum Time-To-Live values of the IP packets; in the continually increasing, the maximum Time-To-Live value of the obtained Time-To-Live values is continuously updated; in the checking, it is checked whether or not the maximum Time-To-Live value is equal to or less than the control value immediately after an Exchange_Key subfunction command is received; in the continuing, an ACCEPTED response is transmitted in response to the Exchange_Key subfunction command when the maximum Time-To-Live value is equal to or less than the control value; and in the terminating, the predetermined packet exchanging procedure is immediately terminated when the maximum Time-To-Live value exceeds the control value.

12. A non-transitory computer-readable medium with encoded computer program for executing on a computer system a process for exchanging IP packets with another information communication apparatus over an IP network, the computer program causing the computer system to execute a method comprising:

when performing a predetermined packet exchanging procedure in which the number of router hops is limited to a predetermined control value or less, monitoring, using a hardware processor, current Time-To-Live values and maximum Time-To-Live values designated in the headers of IP packets received over a monitoring time from the start of the predetermined packet exchanging procedure to immediately before the end of the predetermined packet exchanging procedure, the predetermined packet exchanging procedure including an authentication and key exchange procedure in accordance with DTCP-IP, and the monitoring including monitoring the current Time-To-Live values and the maximum Time-to-Live values in the headers of IP packets carrying authentication-and-key-exchange commands;

continuously increasing the maximum Time-To-Live value to be equal to the current Time-To-Live value if the current Time-To-Live value is greater than the maximum Time-To-Live value during the monitoring time such that each time the current Time-To-Live value exceeds the maximum Time-To-Live value, the maximum Time-To-Live value is increased to be equal to the current Time-To-Live value;

checking whether the maximum Time-To-Live value does not exceed the control value;

continuing the predetermined packet exchanging procedure by performing subsequent packet transmission and reception processing to complete the predetermined packet exchanging procedure when the maximum Time-To-Live value of Time-To-Live values extracted from packets monitored over a period of time from the start of the predetermined packet exchanging procedure to immediately before the end of the predetermined packet exchanging procedure is equal to or less than the control value;

and terminating the predetermined packet exchanging procedure without performing the subsequent packet transmission and reception processing when the maximum Time-To-Live value of Time-To-Live values extracted from packets monitored over a period of time from the start of the predetermined packet exchanging procedure to immediately before the end of the predetermined packet exchanging procedure exceeds the control value.

13. An information communication apparatus that exchanges IP packets with a second information communication apparatus over an IP network, the information communication apparatus comprising:

an IP header monitoring unit, including a hardware processor, that, when performing a predetermined packet exchanging procedure in which the number of router hops is limited to a predetermined control value or less, monitors current Time-To-Live values and maximum Time-To-Live values designated in the headers of IP packets received over a monitoring time from the start of the predetermined packet exchanging procedure to immediately before the end of the predetermined packet exchanging procedure, the predetermined packet exchanging procedure comprises an authentication and key exchange procedure in accordance with DTCP-IP, and the IP header monitoring unit monitors current Time-To-Live values and maximum Time-To-Live values in headers of IP packets carrying authentication-and-key-exchange commands;

a maximum Time-To-Live value updating unit that continuously increases the maximum Time-To-Live value to be equal to the current Time-To-Live value if the current Time-To-Live value is greater than the maximum Time-To-Live value during the monitoring time such that each time the current Time-To-Live value exceeds the maximum Time-To-Live value, the maximum Time-To-Live value updating unit increases the maximum Time-To-Live value to be equal to the current Time-To-Live value; and a Time-To-Live value checking unit that checks whether the maximum Time-To-Live value does not exceed the control value.

14. The information communication apparatus according to claim 13, wherein the information communication apparatus is a client that receives communications from a server over the Internet.

* * * * *